(12) United States Patent
Piirainen et al.

(10) Patent No.: US 6,385,254 B1
(45) Date of Patent: May 7, 2002

(54) TRANSMISSION METHOD AND RADIO SYSTEM

(75) Inventors: Olli Piirainen; Kari Niemelä, both of Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/401,019

(22) Filed: Sep. 21, 1999

Related U.S. Application Data

(63) Continuation of application No. PCT/FI99/00063, filed on Jan. 29, 1999.

(30) Foreign Application Priority Data

Jan. 30, 1998 (FI) .................................................. 980219

(51) Int. Cl.⁷ .......................... H04L 5/12; H04L 23/02; H04L 27/06; H03D 1/00
(52) U.S. Cl. ....................................... 375/262; 375/341
(58) Field of Search ................................ 375/262, 321, 375/341

(56) References Cited

U.S. PATENT DOCUMENTS

| | | | |
|---|---|---|---|
| 4,227,255 A | | 10/1980 | Carrick et al. |
| 5,349,607 A | * | 9/1994 | Moreno ........................ 375/341 |
| 5,479,446 A | * | 12/1995 | Mourot ........................ 375/241 |
| 5,557,644 A | * | 9/1996 | Kuwabara ................... 375/340 |
| 5,602,868 A | * | 2/1997 | Wilson ........................ 375/219 |
| 5,673,293 A | * | 9/1997 | Scarpa et al. ................ 375/321 |
| 5,799,037 A | * | 8/1998 | Strolle et al. ................ 375/233 |
| 5,872,815 A | * | 2/1999 | Strolle et al. ................ 375/321 |
| 5,905,757 A | * | 5/1999 | Kundmann et al. ......... 375/229 |
| 5,940,438 A | * | 8/1999 | Poon et al. .................. 375/222 |
| 6,002,716 A | * | 12/1999 | Meyer et al. ................ 375/231 |
| 6,005,640 A | * | 12/1999 | Strolle et al. ................ 348/726 |
| 6,167,031 A | * | 12/2000 | Olofsson et al. ............ 370/252 |

FOREIGN PATENT DOCUMENTS

| | | |
|---|---|---|
| EP | 0619665 | 10/1994 |
| WO | WO 95/12244 | 5/1995 |
| WO | WO 96/10310 | 4/1996 |

OTHER PUBLICATIONS

International Search Report for PCT/FI99/00063.

* cited by examiner

*Primary Examiner*—Chi Pham
*Assistant Examiner*—Tony Al-Beshrawi
(74) *Attorney, Agent, or Firm*—Altera Law Group, LLC

(57) ABSTRACT

The invention relates to a data transmission method and a radio system implementing method. A transmitter has at least two modulation methods by which it can modulate a signal. One or more demodulators (106) of the receiver demodulates the received signal in a manner which corresponds to each modulation method used. The modulation method used for the signal is inferred in a reference block (110) from the impulse response estimate. The signal according to the inferred modulation method is detected in a detector (114).

21 Claims, 3 Drawing Sheets

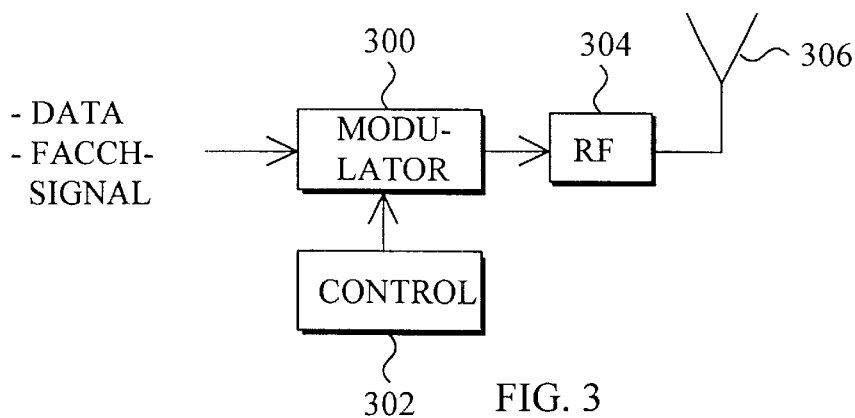
FIG. 3
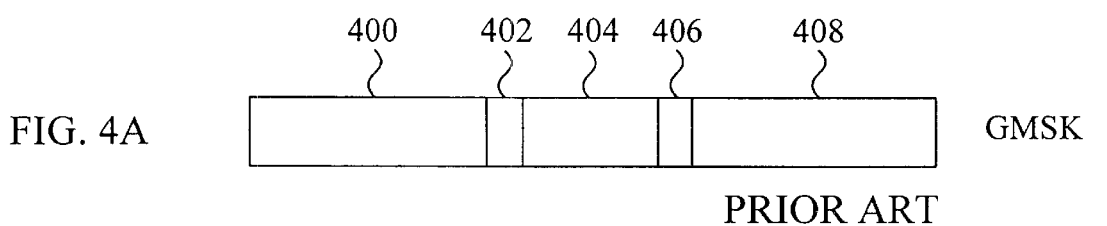
FIG. 4A    GMSK
PRIOR ART
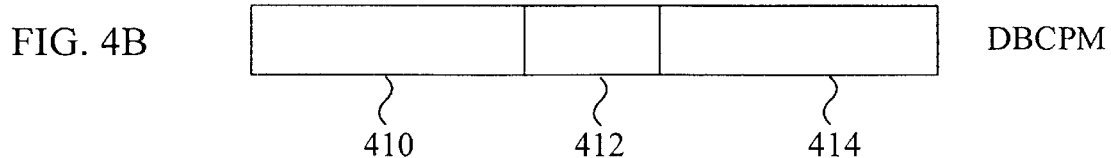
FIG. 4B    DBCPM

TRANSMISSION METHOD AND RADIO SYSTEM

This application is a continuation of PCT/FI99/00063 filed Jan. 29, 1999.

FIELD OF THE INVENTION

The invention relates to a data transmission method used in a radio system comprising at least a base station and a terminal which include a transmitter and a receiver for signal transmission and reception, in which data transmission method a signal is transmitted in bursts which comprise a training sequence, at least two predetermined modulation methods can be used for a signal that is to be transmitted, and the modulation method used is interchangeable to another predetermined modulation method.

The invention also relates to a radio system comprising at least a base station and a terminal which include a transmitter and a receiver for signal transmission and reception, in which radio system the transmitter is arranged to transmit a signal in bursts which comprise a training sequence, it is possible to use at least two predetermined modulation methods for a signal that is to be transmitted, and the modulation method used is interchangeable to another predetermined modulation method.

BACKGROUND OF THE INVENTION

In radio telecommunication systems, the quality of a channel, or a radio path, varies continuously. In radio systems, the channel quality is affected by many factors, including multipath propagation, fadings, interference from the surroundings, and so on.

When known radio systems are planned the aim has been to guarantee the quality of a signal even when the channel quality is poor. When data transmission methods are planned a significant parameter is the modulation method used on a transmission path. Because of losses occurring on the transmission path and because of transmission path capacity, data symbols to be transmitted cannot be transmitted as such, but the symbols must be modulated by a suitable method so as to obtain good transmission path capacity and transmission quality. In other words, when known systems are developed the emphasis has been on selecting a modulation method which guarantees the transmission quality, in which case emphasis is put on the performance of the modulation methods in bad channel conditions. Consequently, the existing methods have a relatively poor ability to transmit signals having a high data rate. In other words, transmission capacity has been guaranteed by sacrificing capacity.

An example of known modulation methods is Gaussian minimum shift keying (GMSK) used in the GSM cellular radio systems (Global System for Mobile Communication). It has a narrow frequency spectrum and high performance, whereas data transmission rates are not very high. Coded continuous phase modulation methods (CPM) usually have a narrow frequency spectrum and high performance, making high data rates possible. However, equipments required become complex in structure, for which reason these methods have not been used in known systems.

In known radio systems it is problematic to change a modulation method smoothly during a continuous connection. The changing of the modulation method presents problems particularly in the receiver, since the transmitter may change the modulation method without notifying the receiver thereof beforehand. However, a smooth change of a modulation method is needed in packet-switched data transmission, for instance. Furthermore, a fast associated control channel (FACCH) signal is to be well-protected from interference particularly in the GSM radio system, even if data were otherwise transmitted by a modulation method allowing a high data rate and being thus prone to interference.

BRIEF DESCRIPTION OF THE INVENTION

An object of the invention is thus to provide a method and a radio system implementing the method so as to solve the above problem. The receiver can then effectively demodulate and detect a transmitted signal, even though the receiver did not know beforehand the modulation method used by transmitter. This is achieved by a method of the type presented in the introduction, which is characterized in that when the transmitted signal is received it is demodulated in the manner which corresponds to each modulation method; an impulse response estimate which corresponds to each modulation method used is formed for the signal received; and the modulation method which is used for the signal transmitted is inferred from the impulse response estimate, and the signal according to the modulation method inferred is selected to be detected. The method is also characterized in that when the transmitted signal is received it is demodulated by only one demodulation method; an impulse response estimate which corresponds to each modulation method used is formed for the signal received, and the modulation method used for the transmitted signal is inferred from the impulse response estimate and the signal is detected.

The invention also relates to a radio system. The system of the invention is characterized in that the receiver comprises at least one demodulator for demodulating the received signal in the manner corresponding to each modulation method used; means for forming an impulse response estimate which corresponds to each modulation method used; means for selecting a demodulated signal for the detector; means for inferring from the impulse response estimate the modulation method which is used for the transmitted signal and for controlling the means to select for the detector a signal which is correspondingly demodulated. The system is also characterized in that the receiver comprises only one demodulator; means for forming an impulse response estimate which corresponds to each modulation method used; means for inferring from the impulse response estimate the modulation method which is used for the transmitted signal; a detector for detecting the signal, and the transmitter is arranged to use modulation methods which can be demodulated by one demodulator of the receiver.

The method and system of the invention provide many advantages. The inventive solution enables different modulation methods to be smoothly combined. Data transmission which is faster than in the prior art is realized particularly in packet-form transmission. In the GSM system, signalling can be carried out according to the prior art without transmitting FACCH bits.

BRIEF DESCRIPTION OF THE DRAWINGS

In the following, the invention will be described in more detail by means of preferred embodiments with reference to the accompanying drawings, in which FIG. 3 shows a block diagram of a transmitter.

FIG. 4a shows a normal burst in the GSM system, and
FIG. 4b shows a modified normal burst.

DETAILED DESCRIPTION OF THE INVENTION

The solution of the invention is particularly applicable for use in a radio system of the GSM type without, however, restricting to it.

Figure 1:
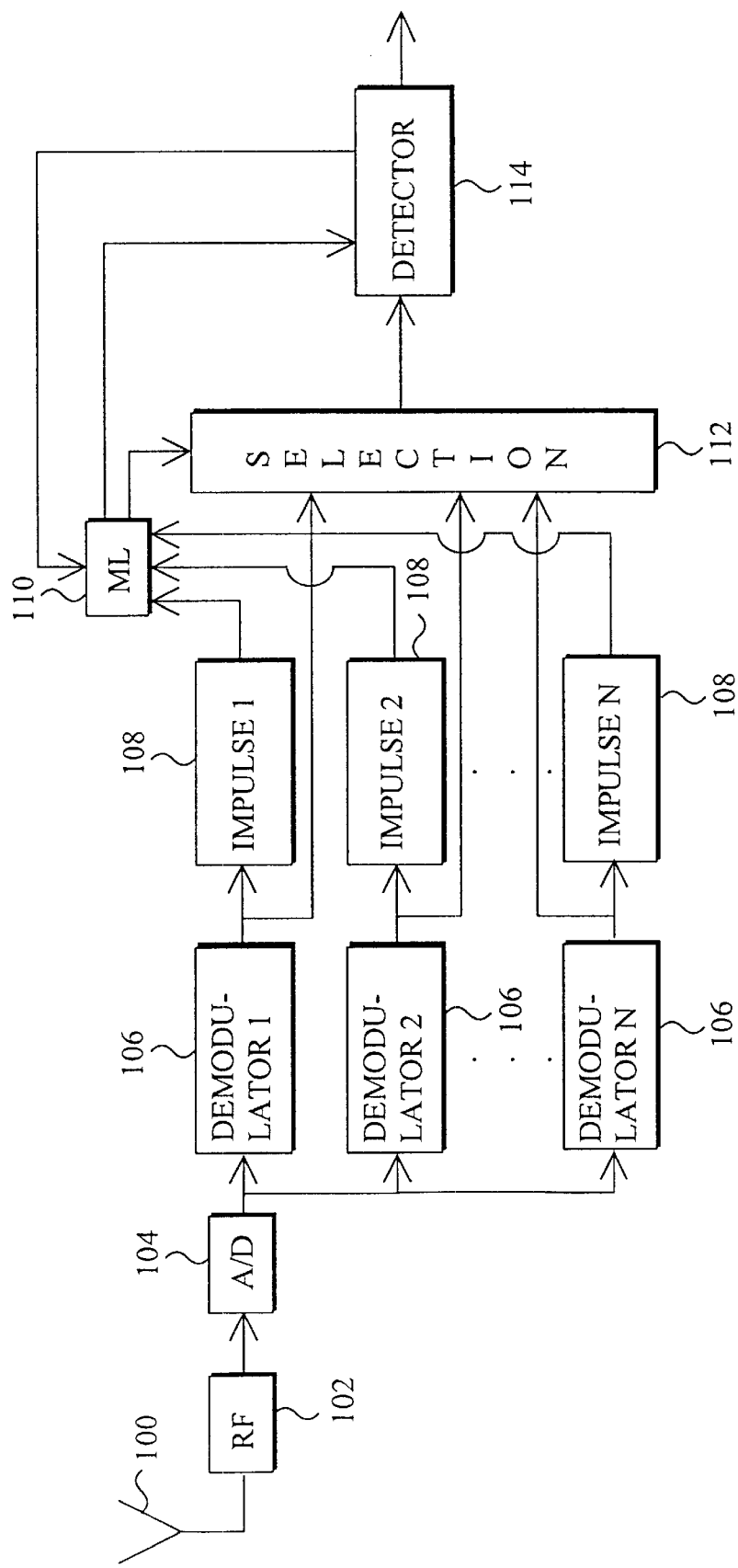
FIG. 1 shows a block diagram of a receiver.

Let us first study the inventive method and receiver by means of FIG. 1. The receiver, either a base station or a terminal, receives a signal by an antenna 100. The radio-frequency signal propagates from the antenna to radio frequency means 102 which multiply the signal received by a signal of a local oscillator and low-pass filter the multiplication result. The intermediate or baseband signal so formed is converted into a digital signal in an A/D converter 104. The digital signal is demodulated in the demodulator 106. The demodulator 106 operates in such a way that it comprises a specific demodulator for each of the N modulation alternatives. After the demodulator 106, an impulse response estimate is formed for the demodulated signal in means 108. The impulse response estimates propagate to means 110 which preferably infer, on the basis of maximum likelihood, the modulation by which the received signal was modulated upon transmission. The principle of maximum likelihood can be based on the energy of the impulse response, a signal-to-noise ratio or a signal-to-interference ratio. High impulse response energy, a good signal-to-noise ratio or a good signal-to-interference ratio indicate the most probable modulation method. The means 110 control a selection means 112, preferably a multiplexer, to select a signal to a detector 114 from the demodulator which, on the basis of the maximum likelihood, corresponds best to the modulation of the signal. The means 110 also control the detector 114 to operate in a correct mode with respect to the modulation of the signal. The detected signal further propagates to prior art processes which are irrelevant to the inventive solution.

Figure 2:
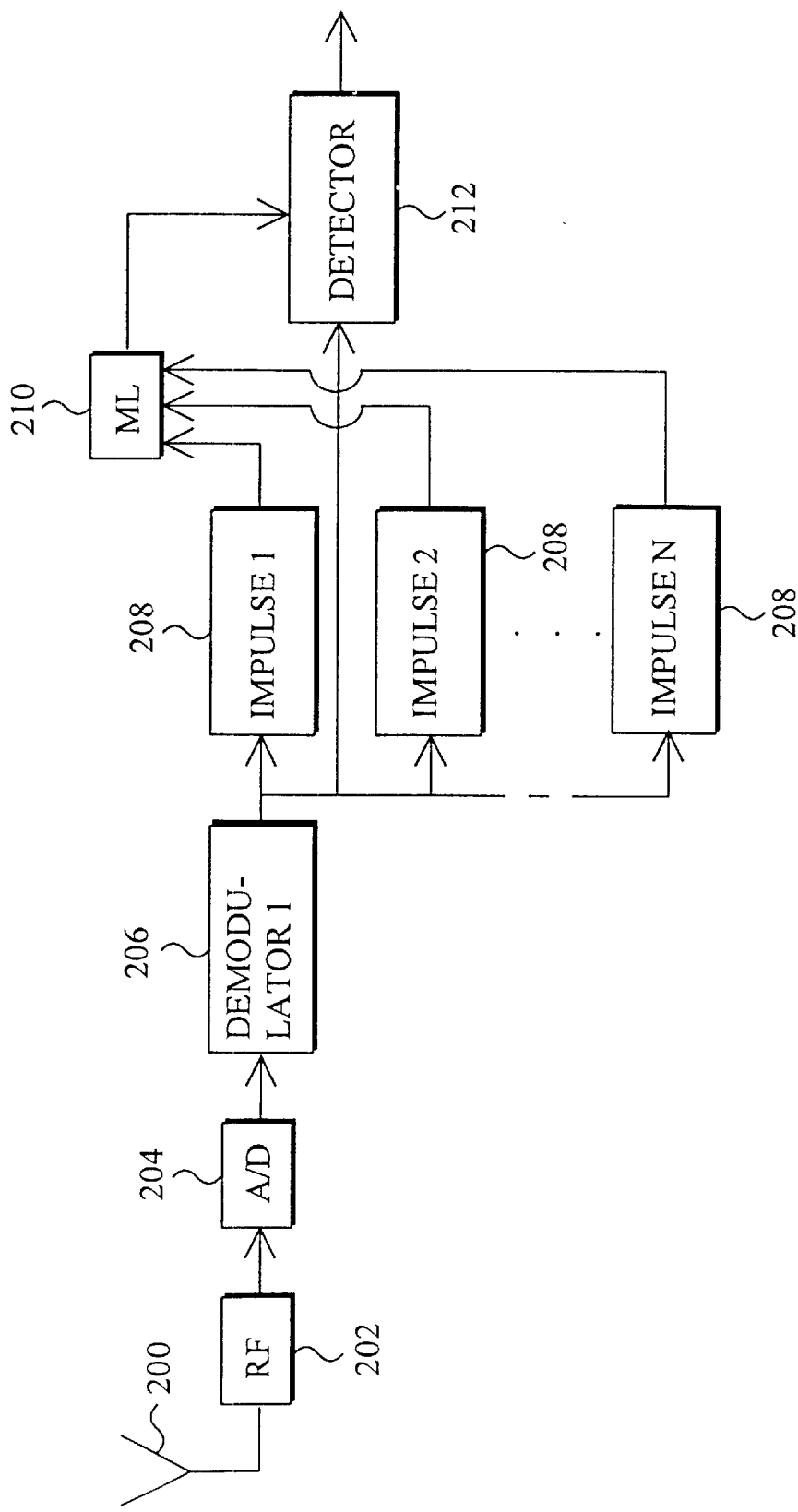
FIG. 2 shows a block diagram of a receiver.

FIG. 2 shows another receiver solution which is applicable when differently modulated signals can be demodulated by a single demodulation method. Such modulation methods include Gaussian minimum shift keying (GMSK) and differentially coded binary continuous phase modulation (DBCPM) methods, for example. GMSK modulation is a modulation method obvious to those skilled in the art, and DBCPM modulation is presented in the GSM standardization forum. A document associated with DBCPM modulation and incorporated herein by reference can be found by the code ETSI STC SMG2 WPB: Tdoc SMG2 WPB 52/98. In DBCPM modulation, a signal is multiplied by a modulation index, such as π/4. In the solution of FIG. 2, the received signal propagates from an antenna 200 to radio frequency means 202 which are similar to those in the case of FIG. 1. The intermediate or baseband signal is converted into a digital signal in an A/D converter 204. The digital signal is demodulated in a demodulator 206 and an impulse response estimate is formed of the signal in means 208. A specific impulse response estimate is formed for each modulation method in a specific estimation block. The modulation method is inferred in means 210 on the basis of the impulse response estimate by preferably using the principle of maximum likelihood. The principle of maximum likelihood may be based on the energy of the impulse response, a signal-to-noise ratio or a signal-to-interference ratio. High impulse response energy, a good signal-to-noise ratio or a good signal-to-interference ratio indicate the most probable modulation method. The means 210 control the mode of a detector 212 so that the demodulated signal that has arrived from the demodulator can be detected. The detected signal further propagates to prior art processes which are irrelevant to the inventive idea.

In the solution of FIG. 1, the detector 114 may also influence on the operation of the means 110 for choosing the modulation method. In that case, the modulation used is inferred again by means of at least partly detected signal, i.e. the correctness of the original inference is checked and the means 110 and the detection mode of the detector 114 are controlled. In the solution according to FIG. 2, the detection mode of the detector 212 can be changed on the basis of the detected signal. The signal can be partly detected by means of portion of a burst, for example.

FIG. 3 shows an example of a block diagram of a transmitter. A transmitter comprises a modulator 300 which is controlled by a controller 302. The modulator can modulate a signal to be transmitted by at least two modulation methods. The controller 302 chooses the modulation method used by the modulator. For example in the GSM system, connection quality permitting, the transmitter transmits a signal at a high data rate by the DBCPM modulation method, but the transmitter which comprises a burst which contains FACCH information transmits at a lower data transmission rate by the conventional GMSK modulation method. For example, DBCPM modulation may have double the data transmission rate as compared with GMSK modulation. Other modulation pairs include quarternary offset quadrature amplitude modulation (Q-O-QAM) and binary offset quadrature amplitude modulation (B-O-QAM). However, the invention is not restricted to modulation methods. The modulated signal propagates next to radio frequency means 304 which multiply the signal by a carrier wave and high-pass filter it. The radio-frequency signal propagates to an antenna 306 which radiates the signal as radio waves to its surroundings.

Let us now have a closer look at a case according to the GSM system, in which case the transmitter transmits by the DBCPM and GMSK modulation methods. FIG. 4A shows a normal burst in the GSM radio system. The burst comprises a data part 400, a FACCH flag bit 402, a training sequence 404 a second FACCH flag bit 406 and a second data part 408. In a conventional GSM transmission the FACCH signal uses the two bits 402 and 406 on both sides of the training sequence 404. It is very important to transmit the FACCH bits reliably. The burst which comprises FACCH bits is therefore always transmitted at a lower data transmission rate, i.e. by the conventional GMSK modulation. Consequently, no FACCH bits are needed in a burst which is transmitted at a higher data transmission rate and modulated by the DBCPM modulation method. This kind of burst which comprises a data part 410, a training sequence 412 and a second data part 414 is presented in FIG. 4B. In the inventive solution the training sequences 404 and 412 of different bursts are preferably overlapped in time domain, i.e. they are at the same point in the burst. In the inventive solution the modulated training sequences are also substantially orthogonal and therefore maximally differ from each other and make it easier to separate the modulations.

Although the invention is described above with reference to the examples according to the accompanying drawings, it is obvious that the invention is not restricted thereto, but it can be modified in a variety of ways within the scope of the inventive idea disclosed in the attached claims.

What is claimed is:
1. A data transmission method used in a radio system comprising at least a base station and a terminal which include a transmitter and a receiver for signal transmission and reception, in which data transmission method a signal is transmitted in bursts which comprise a training sequence (404, 412), it is possible to use at least two predetermined modulation methods for a signal that is to be transmitted, and the modulation method used is interchangeable to another predetermined modulation method, characterized in that when the transmitted signal is received it is demodulated in the manner corresponding to each modulation method;

an impulse response estimate which corresponds to each modulation method used is formed for the received signal; and the modulation method which is used for the transmitted signal is inferred from the impulse response estimate and the signal according to the inferred modulation method is selected to be detected.

2. A data transmission method used in a radio system comprising at least a base station and a terminal which include a transmitter and a receiver for signal transmission and reception, in which data transmission method a signal is transmitted in bursts which comprise a training sequence (404, 412), it is possible to use at least two predetermined modulation methods for a signal that is to be transmitted, and the modulation method used is interchangeable to another predetermined modulation method, characterized in that when the transmitted signal is received it is demodulated by only one demodulation method;

an impulse response estimate which corresponds to each modulation method used is formed for the received signal; and the modulation method used for the transmitted signal is inferred from the impulse response estimate and the signal is detected.

3. A method as claimed in claim 2, characterized in that a detection mode for detecting the signal is selected according to the modulation method used.

4. A method as claimed in claim 1, characterized in that the modulation method is inferred from the impulse response by means of the principle of maximum likelihood.

5. A method as claimed in claim 1, characterized in that the training sequences (404, 412) are overlapped in time domain in a burst transmitted by each modulation method.

6. A method as claimed in claim 5, characterized in that the training sequences (404, 412) modulated by different modulation methods and overlapped in time domain are mutually substantially orthogonal, whereby separating different modulation methods becomes easier in reception.

7. A method as claimed in claim 1, characterized in that the modulation method is inferred from the impulse response by means of the energy of the impulse response, a signal-to-noise ratio or a signal-to-interference ratio.

8. A method as claimed in claim 1, characterized in that the received signal is detected at least partly and the detected portion is utilized when the modulation method of the received signal is inferred.

9. A method as claimed in claim 1, characterized in that modulation methods which operate at a different data transmission rate are used.

10. A method as claimed in claim 9, characterized in that when the GSM radio system is used and when a FACCH signal is transmitted, the FACCH signal is always transmitted at a lower data transmission rate, whereby no FACCH bits are needed in the bursts (412) which operate at higher data transmission rates.

11. A method as claimed in claim 9, characterized in that two modulation methods are used, of which one is DBCPM enabling higher data transmission rate and the other is GMSK.

12. A radio system comprising at least a base station and a terminal which include a transmitter and a receiver for signal transmission and reception, in which radio system the transmitter is arranged to transmit a signal in bursts which comprise a training sequence (404, 412), it is possible to use at least two predetermined modulation methods for a signal that is to be transmitted, and the modulation method used is interchangeable to another predetermined modulation method, characterized in that the receiver comprises at least a demodulator (106, 206) for demodulating the received signal in the manner corresponding to each modulation method used;

means (108) for forming an impulse response estimate which corresponds to each modulation method used;

means (112) for selecting a demodulated signal for the detector (114);

means (110) for inferring from the impulse response estimate the modulation method which is used for the transmitted signal and for controlling the means (112) to select for the detector (114) a signal which is correspondingly demodulated.

13. A radio system comprising at least a base station and a terminal which include a transmitter and a receiver for signal transmission and reception, in which radio system the transmitter is arranged to transmit a signal in bursts which comprise a training sequence (404, 412), it is possible to use at least two predetermined modulation methods for a signal that is to be transmitted, and the modulation method which is used is interchangeable to another predetermined modulation method, characterized in that the receiver comprises only one demodulator (206);

means (208) for forming an impulse response estimate which corresponds to each modulation method used;

means (210) for inferring from the impulse response estimate the modulation method which is used for the transmitted signal;

a detector (212) for detecting the signal, and the transmitter is arranged to use modulation methods which the one demodulator (206) of the receiver is able to demodulate.

14. A radio system as claimed in claim 12, characterized in that the means (110, 210) for inferring the modulation method from the impulse response are arranged to use the principle of maximum likelihood.

15. A radio system as claimed in claim 12, characterized in that the training sequences (404, 412) of different bursts are overlapped in time domain in each modulation method used by the transmitter.

16. A radio system as claimed in claim 15, characterized in that the training sequences (404, 412) which are modulated by different modulation methods and overlapped in time domain are mutually substantially orthogonal, whereby the resolution capacity of different modulation methods increases in the receiver.

17. A radio system as claimed in claim 12, characterized in that the means (110, 210) for inferring the modulation method from the impulse response are arranged to use the energy of the impulse response, a signal-to-noise ratio or a signal-to-interference ratio.

18. A radio system as claimed in claim 12, characterized in that the receiver is arranged to detect the signal at least partly and means (110, 210) for inferring the modulation method are arranged to utilize the detected portion.

19. A radio system as claimed in claim 12, characterized in that the transmitter is arranged to use modulation methods which operate at a different data transmission rate.

20. A radio system as claimed in claim 19, characterized in that the radio system is a GSM radio system which is arranged to transmit a FACCH signal, a transmitter FACCH signal is arranged to always transmit at a lower data transmission rate, whereby no FACCH bits are needed in bursts of the modulation methods which operate at higher data transmission rates.

21. A radio system as claimed in claim 12, characterized in that the transmitter is arranged to use two modulation methods, of which one is DBCPM enabling a higher data transmission rate and the other is GMSK.

\* \* \* \* \*